Jan. 1, 1963 H. A. GREENWALD 3,070,974
SINGLE VALVE REFRIGERATION CONTROL
Filed Dec. 14, 1959 3 Sheets-Sheet 1

INVENTOR:
HAROLD A. GREENWALD,
BY *Myron J. Seibold*
Attorney.

Jan. 1, 1963 H. A. GREENWALD 3,070,974
SINGLE VALVE REFRIGERATION CONTROL
Filed Dec. 14, 1959 3 Sheets-Sheet 2
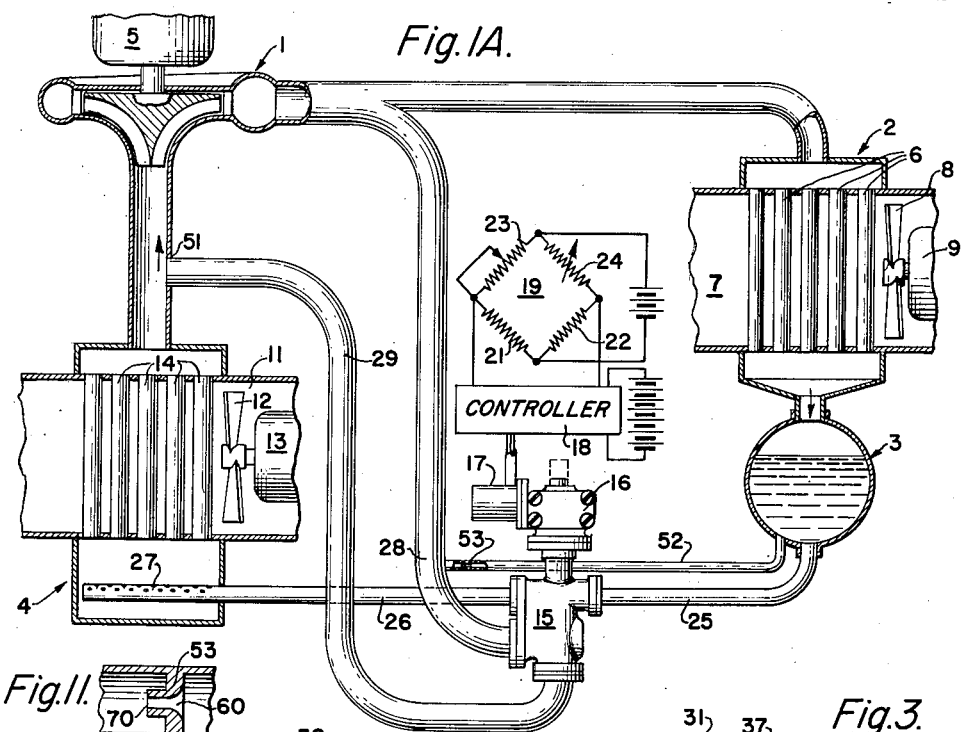
Fig. 1A.
Fig. 11.
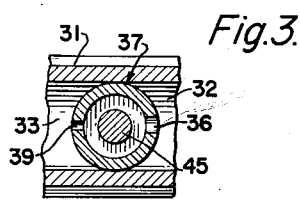
Fig. 3.
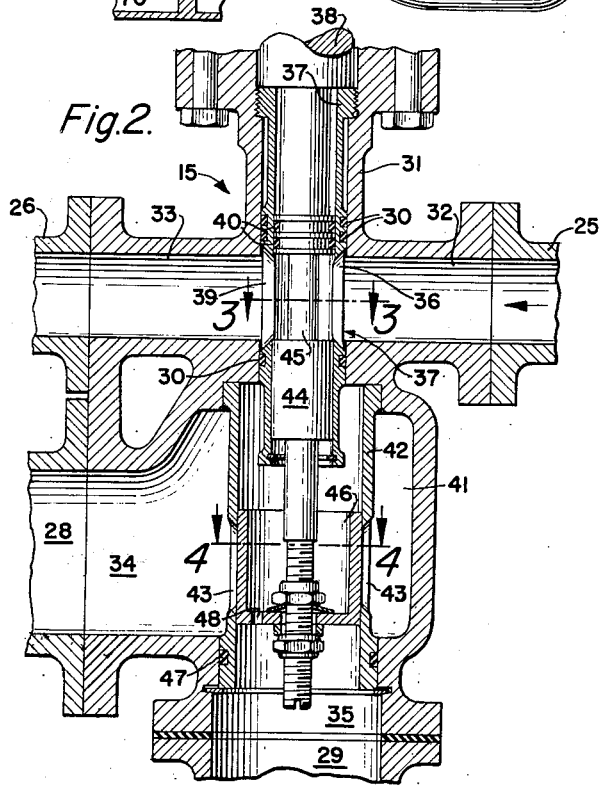
Fig. 2.
Fig. 4.
INVENTOR:
HAROLD A. GREENWALD,
BY *Myron J. Seibold*
Attorney.

Jan. 1, 1963
H. A. GREENWALD
3,070,974
SINGLE VALVE REFRIGERATION CONTROL
Filed Dec. 14, 1959
3 Sheets-Sheet 3
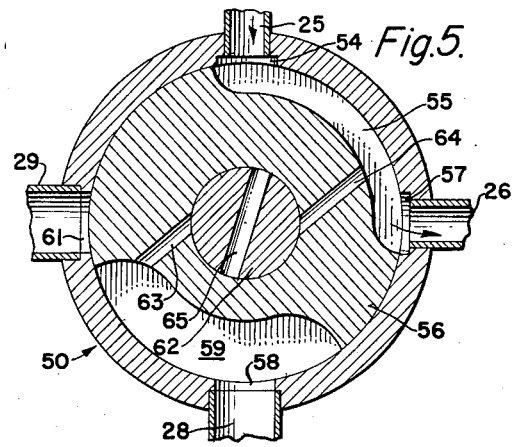
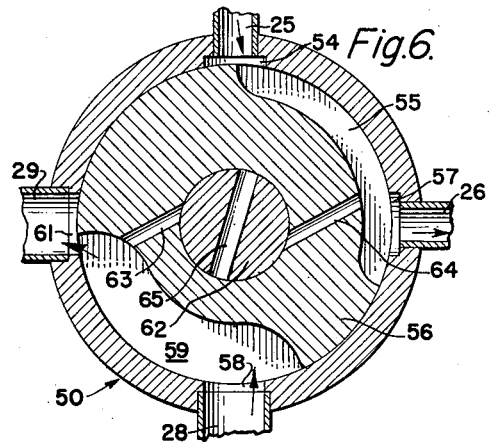
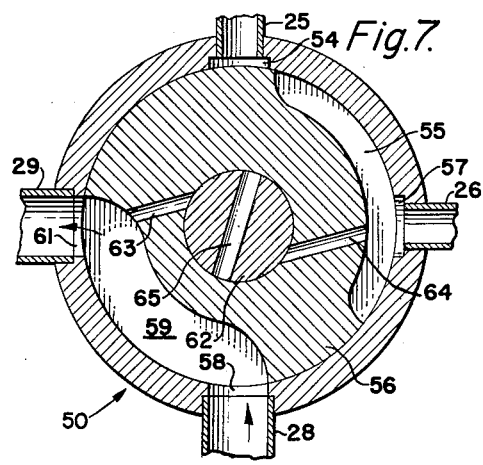
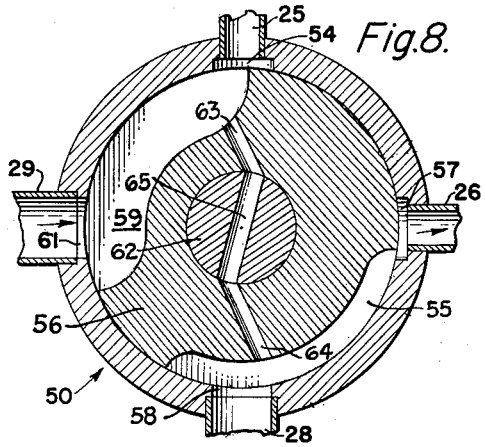
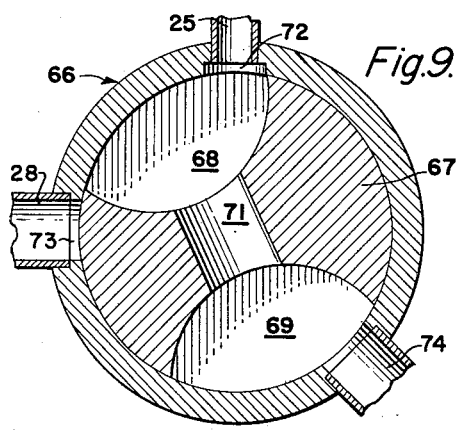
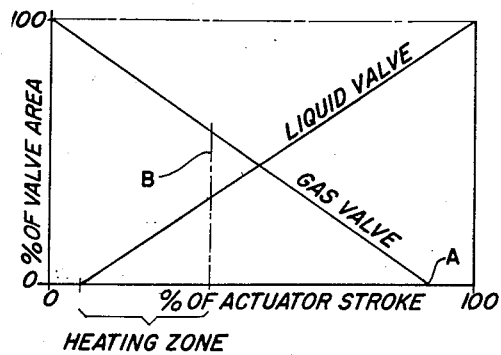
INVENTOR:
HAROLD A. GREENWALD,
BY
Attorney.

United States Patent Office 3,070,974
Patented Jan. 1, 1963

3,070,974
SINGLE VALVE REFRIGERATION CONTROL
Harold A. Greenwald, Los Angeles, Calif., assignor to
The Garrett Corporation, Los Angeles, Calif., a corporation of California
Filed Dec. 14, 1959, Ser. No. 859,346
12 Claims. (Cl. 62—197)

This invention relates to a closed vapor cycle refrigeration system employing a relatively continuously driven centrifugal, axial flow, or other type compressor which is subject to surge operation when the flow therethrough is materially reduced from the designed flow, in which system the flow of refrigerant fluid is controlled by a single valve assembly or component.

In the operation of a closed vapor cycle refrigeration system using a continuously rotating centrifugal or axial flow type compressor, it is common practice to control the flow of refrigerant fluid by three independently operating valves, the liquid refrigerant passing from the receiver through an expansion valve to the evaporator, a modulating valve also being used to regulate the evaporator pressure, and hence the liquid flow through the evaporator, in accordance with an external temperature to be controlled. A third valve is used to by-pass the evaporator and feed refrigerant gas from the high pressure side of the refrigeration system to the low pressure side of the system to prevent compressor surge with decreased fluid flow. According to the present invention, the functions of the above three valves are consolidated and performed in a "single" valve control, with the valve of either a 3-way or 4-way type, depending on the absence or presence, respectively, of a refrigerant distributor in the evaporator of the system, as will be explained more fully hereinafter.

The advantages of the present system include greater reliability since small orifices and/or diaphragms or equivalent, inherent in pneumatic controls, are eliminated, and elimination of two valves and their associated plumbing with attendant simplification, lowered weight and less cost. The system provides for a heating cycle, if desired, where hot gas, by-passing the condenser, is fed to the evaporator. This arrangement also, in the refrigeration cycle, facilitates compressor lubrication by preventing possible accumulation of lubricating oil in the evaporator.

It is, therefore, the object of the invention to provide a single valve control for a closed vapor cycle refrigeration system employing a relatively continuously driven centrifugal axial flow or other type compressor subject to operation under surge conditions.

Another object of the invention is the provision of a closed vapor cycle refrigeration system in accordance with the preceding object in which flow of liquid refrigerant from the condenser to the evaporator and flow of gaseous refrigerant from the high pressure side of the system to the low pressure side thereof will be throttled by one valve assembly.

Another object of the invention is a vapor cycle refrigeration system in accordance with the preceding object in which the valve increases gas flow as the liquid flow decreases from a condition of full refrigeration to a condition of reduced refrigeration load, thus maintaining adequate flow to prevent operation of the compressor under surge conditions.

Another object of the invention is a vapor cycle refrigeration system in accordance with the preceding object in which hot gas flows from the compressor outlet, through the evaporator, to the compressor inlet so that under conditions of zero evaporator refrigeration load the heating effect of the gas and the cooling effect of the liquid are balanced.

Another object of the invention is a vapor cycle refrigeration system in accordance with the preceding object in which the valve control ranges from a condition of full cooling with gas flow cut off and liquid flow at a maximum to a condition where the liquid flow is cut off and gas flow is at a maximum, the evaporator under the latter condition effecting a heating cycle in the system.

Another object of the invention is a vapor cycle refrigeration system in accordance with the preceding object, in which the valve may be of either a 3-way or 4-way type, the former mixing the gas and liquid at the valve and feeding them together to the evaporator and the latter carrying gas to the low pressure side of the system separate from the liquid flow, the gas being fed either to the evaporator or downstream thereof.

Other objects and features of the invention will be readily apparent to those skilled in the art from the following specification and appended drawings, in which:

FIG. 1A is a view similar to FIG. 1, but showing feeding of refrigerant gas from the compressor outlet to the downstream side of the evaporator.

FIG. 2 is a sectional view of a 4-way valve employed in the system of the invention.

FIG. 3 is a detailed sectional view on the line 3—3 of FIG. 2.

FIG. 4 is a detailed sectional view on the line 4—4 of FIG. 2.

FIG. 5 is a schematic view of a rotary type 4-way valve employable in the system of this invention and shown in the full cooling position.

FIG. 6 is a view similar to FIG. 5, but showing the valve in a modulating position.

FIG. 7 is a view similar to FIGS. 5 and 6 showing valve position for full heating in the system.

FIG. 8 is a view similar to FIGS. 5, 6 and 7, but showing valve position for draining the evaporator when the compressor drive is de-energized.

FIG. 9 is a schematic representation of a 3-way valve under full cooling operation and illustrating the use of a 3-way valve for mixing liquid and gas by such a control valve.

FIG. 10 is a graphical representation of the relation between the actuator stroke and the area of the valve ports under operating conditions for both the heating and cooling cycles.

FIG. 11 is a detailed sectional view of a bleed orifice.

Figure 1:
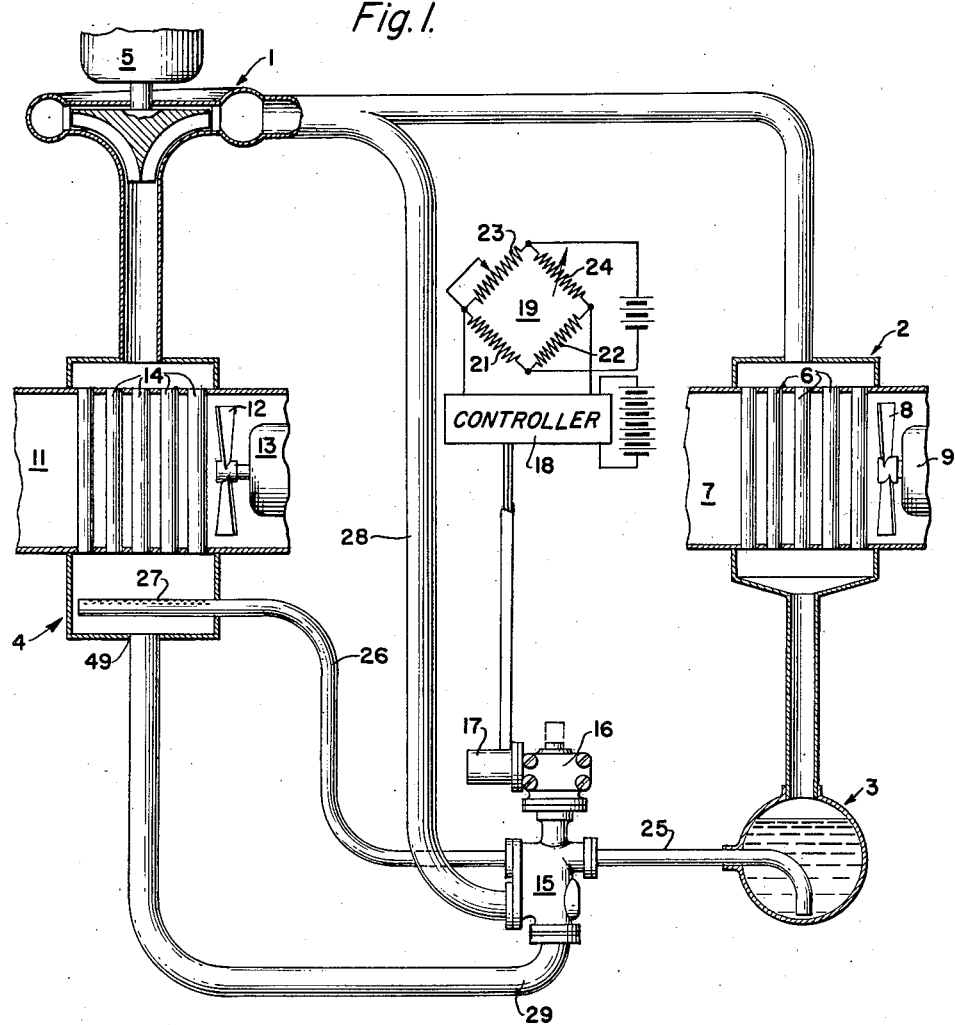
FIG. 1 is a schematic representation of a preferred form of closed vapor cycle refrigeration system according to the invention.

The schematic system representation of FIG. 1 employs the conventional system elements of a centrifugal compressor 1, a condenser 2, a receiver 3 and an evaporator 4. The compressor 1 is rotated by any conventional driving means such as an electric motor 5, which is continuously energized during operation of the system, modulation of evaporator refrigeration capacity being provided for through control of the liquid and/or gas flow. The refrigerant fluid may be of any suitable composition, such as one of the Freons commonly employed.

The condenser 2 is a heat exchange element in which the hot compressed gas is cooled and liquified within heat exchange tubes 6 by the passage thereover of a suitable cooling fluid impelled through a duct 7 by a blower, fan or pump 8 rotated by a continuously energized motor 9. The refrigerant liquid from the condenser 2 passes for storage into the receiver 3. The evaporator 4 is a heat exchange device in which air or other fluid flows through a duct 11, under the influence of a fan, blower or pump 12 driven by a motor 13, in heat exchange relation with the cooled liquid and/or gas within heat exchange tube 14.

A single control valve component is shown at 15 and in detail in FIGS. 2 through 4 wherein it is specifically illustrated as a rectilinearly movable valve of the spool type. This valve is operated by a linear actuator 16 driven by a motor 17 from a controller 18. Actuation occurs upon proper signal, typically a temperature error signal, to the controller 18 from a resistance bridge 19, having fixed legs 21 and 22, an adjustable leg 23 and a temperature responsive thermistor sensor 24. Unbalance of the bridge and the polarity thereof will determine the operation and direction of rotation of the motor 17 to cause movement of the valve 15 in the desired direction to effect a modulating control for the valve. The valve as shown in FIG. 1 is of the 4-way type controlling the passage of liquid from the receiver 3 and hot gas from the compressor outlet to the evaporator. The liquid from the receiver 3 is fed to the valve 15 through a conduit 25 and from the valve 15 through a conduit 26 to a distributor tube 27 within the evaporator 4. A hot gas conduit 28 leads from the discharge line of compressor 1 to the valve 15, the hot gas being thence fed through a conduit 29 to the evaporator 4.

The linear actuator 16 and motor drive 17 may take any conventional form and, for example, may be readily adapted from the structure shown in the patents to G. H. Gill, No. 2,328,897, dated September 7, 1943, for Airplane Flap Operating Means, and to J. E. Chapman, No. 2,482,464, dated September 20, 1949, for Electrical Jack and Control Means. The controller 18 for the motor 17 may take any desired form, one being a polarized sensitive relay energized by the error signal from the bridge 19 to control the direction of rotation of the motor 17. For electronic control operation, the motor 17 can be controlled in accordance with the teachings of the patent to C. A. Shank et al., No. 2,703,679, dated March 8, 1955, for Electronic Temperature Regulator, and for magnetic amplifier control operation could be controlled in accordance with the disclosure of co-pending application of Robert C. Byloff, No. 513,091, filed June 3, 1955, for Magnetic Amplifier Control Apparatus, now Patent No. 3,021,474.

The valve 15 of FIG. 1 is shown in cross-sectional detail in FIGS. 2 through 4, as comprising a casing 31 having a liquid inlet passage 32 and outlet passage 33 and a gas inlet passage 34 and outlet passage 35. The liquid passages are intercommunicated through ports 36 and 39 within a sleeve 37 disposed within the casing 31 and sealed with respect thereto at 30. The port 39 cooperates with a movable valve part to throttle the flow of liquid through the valve.

The gas inlet passage 34 terminates in a cylindrical chamber 41 within which is disposed a sleeve 42 having circumferentially spaced throttling ports 43. The valve actuator is indicated at 38 and comprises a spindle for portions of varying diameter extending through the sleeves 37 and 42. It is sealed with respect to the inner surface of the sleeve 37 at 40. The portion 44 of the valve actuator controls the area of the throttling port 39 from the fully open position of FIG. 2, where the reduced diameter actuator portion 45 is disposed between the ports 36 and 39, through a fully closed position where the portion 44 seals off the port 39, to an extreme position, beyond the closed position, where a portion of the port 36 is uncovered for drainage of trapped liquid from the evaporator to the receiver when the compressor drive is deenergized. The lower end of the actuator 38, as viewed in FIG. 2, carries a cup-shaped member 46 controlling the area of the gas throttling ports 43, and hence the flow of gas through the valve. The sleeve 42 is sealed with respect to the casing 31 at 47.

The valve of FIG. 2 is shown in full cooling position with the port 39 wide open and the ports 43 closed, thus providing for maximum flow of liquid refrigerant from the receiver 3 to the evaporator 4 within the limits of the minimum throttling effect of the port 39, this being normally selected to be comparable to the minimum throttling effect of the expansion valve in the 3-valve system. Under the influence of the unbalance in the bridge 19, as less cooling is called for in the enclosure or other space, element or equipment to be cooled, the controller 18 will cause the motor 17 to be energized to move the linear actuator 16 and hence valve actuator 38 upwardly, as viewed in the figures, and the portion 44 of the valve actuator will start to reduce the effective area of the liquid flow throttling port 39.

At a point corresponding to an actuator stroke as shown on the graph of FIG. 10 at A, the cup-shaped valve operating or controlling member 46 starts to uncover the throttling ports 43 and permits limited passage of hot gas through the valve. As shown in FIG. 1, the liquid is fed to a distributor tube 27 through the conduit 26 and the gas is fed directly to the evaporator through the conduit 29.

At a point in the movement of the actuator represented by line B, the heating effect of the gas passing to the evaporator and the cooling effect of the liquid fed thereto are such that there is zero refrigeration capacity in the evaporator. In ordinary operation in the refrigeration cycle, the valve actuator 38 will be moved by the linear actuator 16 at the modulating point or points where more or less cooling is called for by the controller in returning the bridge 19 to balance, and this movement will result in varying proportion of liquid and gas being fed to the evaporator in accordance with the cooling requirements imposed on the system, the valve moving to the position represented by line B only when neither heating nor cooling is required and the system ceases to modulate.

The graph of FIG. 10 represents the actuator stroke over the combined heating and cooling cycles of valve movement and does not show the extreme valve position, beyond the full heating position, which extreme position provides for an evaporator drainage opening through the valve. To reach this drain position, the actuator 16 is electrically biased to its upper extreme position when the motor 5 is de-energized. This electrical bias may take any well known form and be incorporated within the controller 18 so that when the motor 5 is de-energized to shut the system down at the completion of a run, the actuator 16 and valve actuator 38 will be moved upwardly to their extreme position where the port 36 is uncovered beneath the port closing portion 44. To provide this return path from the evaporator for the draining of liquid trapped therein back to the receiver 3, the bottom of the cup-shaped member 46 is provided with an opening 48 which also serves, in normal operation, to equalize the pressure above and below the member 46. The drainage back from the evaporator to the receiver then follows conduit 29, gas outlet 35, opening 48 in member 46, sleeve 37, port 36, passage 32 and conduit 25, under the influence of gravity. This drain is desired so that if the system is started again a short time after it has been de-energized, any liquid trapped or condensed in the evaporator 4 will have been drained therefrom, and hence the carrying of liquid into the compressor 1, with attendant possibility of damage, is prevented.

Alternatively, the actuator 38 can be electrically biased to its lowermost position as shown in FIG. 2 and draining relied upon to take place in reverse direction through the distributor tube 27, conduit 26, passage 33, ports 39 and 36, passage 32 and conduit 25 to the receiver 3. However, the first described drain through the conduit 29 is preferred, as it is effected more quickly and completely.

While the system has been described heretofore with particular reference to the refrigeration cycle thereof, the graph of FIG. 10 shows that a heating cycle may be effected in the system by movement of the valve actuator to the left of line B. As described above, at line B the evaporator refrigeration capacity is zero with the heat supplied by the gas balanced by the cooling effect of the liquid. As the actuator structure moves to the left of line B, a greater amount of gas and a lesser amount of liquid will feed to the evaporator so that the heating effect will predominate and heat will be available for transfer to the air or other fluid within the duct 11. At the position shown as zero actuator stroke the actuator 38 has moved to a position where the liquid port 39 is completely closed and the gas ports 43 are fully open, and this represents the maximum heating condition. It is thus seen that with the same system elements and control valve, a heating as well as a cooling cycle can be secured in the system, as called for by the temperature sensor and as provided by the relative proportions of hot gas and liquid refrigerant fed to the heat exchange evaporator.

FIG. 1A is smilar to FIG. 1, the major difference being the point at which the conduit 29 is connected to the low pressure side of the system. In FIG. 1 the conduit 29 is connected directly to the evaporator and to the lower portion thereof, as as 49, and hence is connected on the upstream side of the evaporator. In FIG. 1A the conduit 29 is connected at the downstream side of the evaporator, as at 51. In the structure of FIG. 1A, it is seen that the hot gas does not pass through the evaporator 4 but instead is fed directly to the inlet of the compressor 1. While this arrangement will perform the surge prevention function as well as in FIG. 1, it is seen that the heating cycle operation is no longer possible and that the gas no longer helps in keeping the lubricating oil in circulation.

In the system connection of FIG. 1A, the temperature of the compressed gas may be such as to effect an undesirable increase in the temperature of the compressor inlet and to prevent this a bleed tube 52 having a restricting orifice 53 interconnects the hot gas conduit 28 and the liquid within the receiver 3. When the ports 43 of the valve 15 are entirely closed, the pressure within the conduit 28 will, if anything, be slightly greater than that within the receiver 3 and some direct flow of hot gas into the receiver may take place through the tube 52. To minimize this flow an orifice such as shown in FIG. 11 may be used. This is a double orifice employing on the liquid side a rounded approach orifice 60 having a high coefficient of discharge and on the gas side a re-entrant short pipe 70 having a low coefficient of discharge. This double orifice thus has a greater impedance to flow of fluid toward the right than toward the left, as viewed in FIG. 11, and gas flow through tube 52 is minimized. When the ports 43 are uncovered a larger pressure difference exists in a reverse sense between the receiver 3 and the conduit 28 and liquid refrigerant is fed through the tube 52, past the restrictive orifice 53 into the conduit 28 to effect cooling of the hot gas and accompanying lowering of the temperature at the compressor inlet.

When used in this specification and in the appended claims, the term "high pressure side of the system" refers to that portion of the system located between the compressor outlet and the control valve, while "low pressure side of the system" refers to that portion of the system disposed between the control valve and the compressor inlet. The term "upstream" of an element refers to that side of the element toward which flow is approaching, while the term "downstream" of an element refers to that side of an element from which flow is leaving.

FIGS. 5 through 7 are shown to illustrate various positions of a controlling valve of the rotary type in full cooling, modulating and full heating positions within the operating cycle of the system. While the valve of FIGS. 1 through 4 is shown as a rectilinearly movable valve and the valve of FIGS. 5 through 8 as a rotary valve, it will be understood that the particular form which the valve takes is immaterial to the system and the rotary valve of FIGS. 5 through 8 has been selected only as more clearly illustrative of the operational characteristics of this type of refrigerant control. It will be understood that in the operation of the valve of FIGS. 5 through 8, a rotary valve actuator will be substituted for the linear valve actuator 16 discussed in connection with FIGS. 1 through 4.

In the valve 50 of FIGS. 5 through 8 the liquid and gas conduits connected to the valve have been given the same numerals as in FIGS. 1 through 4 to point out their similarity of operation. The conduit 25 here leads to a liquid inlet port 54 which communicates with a groove 55 in the rotor 56 of the valve 50 to lead the liquid to an outlet port 57 communicating with the conduit 26. Similarly the conduit 28 communicates with a gas inlet port 58 adapted to register with a groove 59 in the rotor 56 to communicate the port 58 with an outlet port 61 connected to the conduit 29. The rotor 56 rotates about a stationary shaft 62 and has a pair of passages 63 and 64 therein communicating respectively with the annular passages 59 and 55 in the periphery of the rotor. The inner ends of the passages 63 and 64 communicate with the central bearing surface of the rotor. The central shaft 62 has a through passage 65 adapted to intercommunicate the passages 63 and 64 in an extreme position of the rotor 56, as shown in FIG. 8 and as will be explained hereinafter.

The position of the valve rotor 56 in FIG. 5 shows full liquid port open, gas port closed, corresponding to the position of the rectilinear valve 15 as shown in FIG. 2. This is the position of the valve for full or maximum cooling load on the system. The outlet port 57 for the refrigerant liquid has the same length as the ports 58 and 61 for the refrigerant gas, but is much narrower to provide a considerably less cross-sectional area, similar to the relative areas of the throttling ports 39 and 43 of the valve 15. Also, the cross-sectional area of the outlet port 57 is appreciably less than the cross-sectional area of the conduit 25 so that even with the valve 50 fully open with respect to the flow of liquid, as in the position of FIG. 5, throttling will occur at the port 57 comparable to that throttling which occurs at the expansion valve of the 3-valve system.

In FIG. 6 the rotor 56 has moved clockwise under the influence of the valve actuator into a modulating position where both the liquid inlet and gas inlet ports are partially uncovered so that both liquid and gas are being fed from the high pressure to the low pressure side of the system, as shown in either FIG. 1 or FIG. 1A, the term "low pressure side of the system" covering conditions where the gas from the high pressure side is fed either upstream or downstream of the evaporator. The position of the valve in FIG. 6 is said to be a modulating position as the valve will be moving in clockwise and counter-clockwise directions as called for by the signal from the bridge 19 to vary the proportions of liquid and gas which are fed through the valve in accordance with the load requirements on the system.

In FIG. 7 the rotor 56 is in a position of maximum heating at the evaporator corresponding to the zero position of the actuator in the graph of FIG. 10. Here the inlet port for the hot gases is completely open and the inlet port for the liquid fully closed, and thus the heat exchanger represented in the evaporator 4 is now providing maximum heat to the fluid in the duct 11.

In FIG. 8 the rotor has moved to an extreme clockwise position beyond the full heating position of FIG. 7. The operator of valve 50 is electrically biased, as was the actuator 16 of FIGS. 1 through 4, so as to move the valve rotor 56 beyond the full heating position, just as the valve actuator 38 of FIG. 2 was moved upwardly beyond the full heating position. In this extreme clockwise position of rotation of the rotor 56, as shown in FIG. 8, the passages 63 and 64 through the rotor 56 are intercommunicated by the passage 65 through the shaft 62 so as to inter-communicate the annular passages 59 and 55 in the rotor 56 and hence the conduits 29 and 25, thus providing for draining of the liquid from the evaporator 4 back into the receiver 3 when the compressor drive motor 5 is de-energized to shut down the system.

FIG. 9 schematically illustrates a 3-way valve usable in the system where no distributor tube 27 is utilized within the evaporator. In this showing, the valve 66 is provided with a rotor 67, having a pair of grooves 68 and 69 connected by a passage 71. In this arrangement the liquid feeding conduit 25 connects with a liquid inlet port 72 and the gas conduit 28 connects with a gas inlet port 73, the ports 72 and 73 being related in length, width and area in the same manner as the inlet ports 54 and 58 of FIGS. 5 through 8. The groove 68 in rotor 67 is adapted to inter-communicate varying proportions of the ports 72 and 73 and in turn, through the passage 71, connect them with the groove 69 and an outlet conduit 74, which leads to the evaporator 4. The position of FIG. 9 is that of full cooling load on the system with the port 72 fully opened and the port 73 fully closed. The rotor 67 will move counter-clockwise into a modulating position where it uncovers varying proportions of the ports 72 and 73 in accordance with the load requirements on the system. It will be seen that in the 3-way valve of FIG. 9, the gas and liquid will commingle at the valve and be conducted together through the conduit 74 to the evaporator 4, as distinguished from the arrangement shown in FIG. 1 in which the refrigerant liquid and gas are separately conducted to the evaporator, the latter system requiring the 4-way valve, such as shown in FIGS. 2 through 8.

While the description herein has been directed to a single valve control, it will be understood that the term "single" relates more to valve operation, than to mere structure and that the term is intended to include separate valving arrangements, pneumatically, mechanically or electrically coupled to work in unison, but in a reverse sense. This interpretation is particularly borne out by the valve showing of FIG. 2 wherein the valve represented by the port 39 and actuator portion 44 and the valve represented by the ports 43 and the cup-shaped member 46 are separate and distinct insofar as fluid passage are concerned, but are mechanically joined by the actuator itself to operate in unison, but in a reverse sense, to close the port 39 as the port 43 opens, and vice versa. The designation "single," "one" or "a" as used for the valve in the specification and in the claims, either directly or by inference or implication, are intended to include any valve arrangement responsive to a single or common signal to effect concurrent actuation.

It will be understood that the relative openings of the gas and liquid portions of the control valve can be varied with respect to each other to obtain any desired relative gas and liquid flows for a particular system. Also the throttling ports can be shaped to obtain flow ratios different than those obtainable from the rectangular ports herein specifically disclosed.

Where the designation "centrifugal compressor" is used in the specification and in the claims it is intended to include axial flow and other type compressors subject to operation under surge conditions when the flow therethrough is materially reduced from standard design flow.

While certain preferred embodiments of the invention have been specifically disclosed, it is understood that the invention is not limited thereto, as many variations will be readily apparent to those skilled in the art and the invention is to be given its broadest possible interpretation consistent with the prior art.

What is claimed is:

1. In a closed cycle refrigeration system having a centrifugal compressor, a condenser and an evaporator, means for effecting relatively continuous operation of said compressor, and modulating means for said system comprising: a valve on the downstream side of the condenser for controlling flow of refrigerant fluid to the evaporator, temperature responsive means controlling the position of said valve, means by-passing the condenser to feed hot compressed gas to said valve, means feeding said gas from said valve to the low pressure side of the system wherein hot compressed gas and refrigerant fluid are not commingled within said valve means within said valve for expanding said refrigerant fluid, and means in said valve governed by the position thereof for determining the relative proportions of refrigerant liquid and gas fed through the valve.

2. In a closed cycle refrigeration system having a centrifugal compressor, a condenser and an evaporator, means for effecting relatively continuous operation of said compressor, and modulating means for said system: a valve on the downstream side of the condenser for controlling flow of refrigerant liquid to the evaporator, temperature responsive means controlling the position of said valve, means feeding refrigerant gas from the high pressure side of the system through said valve to the low pressure side of the system wherein refrigerant gas and liquid are not commingled within said valve means within said valve for expanding said refrigerant liquid, means in said valve governed by the position thereof for determining the relative proportions of refrigerant liquid and gas fed through the valve, means biasing said valve to an extreme position when the compressor is de-energized to terminate system operation, and means in said valve operative in said extreme position for draining liquid from the evaporator, the evaporator being located at a higher elevation than said valve so that liquid will drain from the evaporator under the influence of gravity.

3. In a vapor cycle refrigeration system having a condenser, an evaporator and a relatively continuously operating compressor and modulating to a predetermined temperature by the supply of refrigerant to the evaporator, a modulating valve, means responsive to said temperature and variations therefrom for controlling the position of said valve, means feeding refrigerant liquid to said valve, means within said valve for expanding said refrigerant liquid, means feeding refrigerant gas from the high pressure side of the system to said valve, means feeding said refrigerant liquid and gas from said valve to the low pressure side of said system, and means in said valve governed by the position thereof for determining the relative proportions of refrigerant liquid and gas fed through the valve to modulate the cooling effect obtained in the evaporator and simultaneously prevent compressor surge.

4. In a vapor cycle refrigeration system having a condenser, an evaporator and a relatively continuously operating compressor and modulating to a predetermined temperature by the supply of refrigerant to the evaporator, a modulating valve, means responsive to said temperature and variations therefrom for controlling the position of said valve, means feeding refrigerant liquid to said valve, means feeding refrigerant gas from the high pressure side of the system to said valve, means feeding said refrigerant liquid from the valve to the evaporator, means feeding the refrigerant gas from the valve to the low pressure side of the system, and means in said valve governed by the position thereof for determining the relative proportions of refrigerant liquid and gas fed through the valve wherein refrigerant gas and liquid are not commingled within said valve.

5. In a vapor cycle refrigeration system having a condenser, an evaporator and a relatively continuously operating compressor and modulating to a predetermined temperature by the supply of refrigerant to the evaporator, a modulating valve, means responsive to said temperature and variations therefrom for controlling the position of said valve, means feeding refrigerant liquid to said valve, means feeding refrigerant gas from the high pressure side of the system to said valve, means within said valve for expanding said refrigerant liquid, said valve constructed so that refrigerant gas and refrigerant liquid are not commingled prior to the expansion of said refrigerant liquid, a distributor in said evaporator, means feeding said refrigerant liquid from said valve to said distributor, means feeding said refrigerant gas from said valve to the low pressure side of said system, and means in said valve governed by the position thereof for determining the relative proportions of refrigerant liquid and gas fed through the valve to modulate the cooling effect obtained in the evaporator and simultaneously prevent compressor surge.

6. In a vapor cycle refrigeration system having a centrifugal compressor, a condenser and an evaporator, means for effecting relatively continuous operation of said compressor, and modulating means for said system comprising: a valve on the downstream side of the condenser for controlling flow of refrigerant liquid to the evaporator, temperature responsive means controlling the positon of said valve, means within said valve for expanding said refrigerant liquid, means feeding refrigerant gas from the high pressure side of the system to the evaporator whereby refrigerant gas is not commingled with other fluids within said valve, and means governed by the position of the valve for controlling the amount of refrigerant gas so fed.

7. In a closed cycle refrigeration system having a centrifugal compressor, a condenser and an evaporator, means for effecting relatively continuous operation of said compressor, and modulating means for said system comprising: a valve on the downstream side of the condenser for controlling flow of refrigerant liquid to the evaporator, temperature responsive means controlling the position of said valve, means feeding hot compressed refrigerant gas from the upstream side of the condenser to the low pressure side of the system downstream of the evaporator, means governed by the position of said valve for controlling the amount of refrigerant gas so fed, and means for bleeding a portion of refrigerant liquid into the refrigerant gas so fed so as to reduce the temperature of the compressor inlet.

8. In a closed cycle refrigeration system having a condenser, an evaporator and a relatively continuously operating compressor and modulating to a predetermined temperature by the supply of refrigerant to the evaporator, a modulating valve, means responsive to said temperature and variations therefrom for controlling the position of said valve, means feeding refrigerant liquid to said valve, means within said valve for expanding said refrigerant liquid, means feeding hot compressed refrigerant gas from the upstream side of the condenser to said valve, a distributor tube in said evaporator, means feeding the refrigerant liquid from the valve to the distributor tube, means feeding the hot refrigerant gas from the valve to the low pressure side of said system, and means in said valve governed by the position thereof for determining the relative proportions of refrigerant liquid and gas fed through the valve.

9. In a closed cycle refrigeration system having a condenser, an evaporator and a relatively continuously operating compressor and modulating to a predetermined temperature by the supply of refrigerant to the evaporator, a modulating valve, means responsive to said temperature and variations therefrom for controlling the position of said valve, means feeding refrigerant liquid to said valve, means within said valve for expanding said refrigerant liquid, means feeding hot compressed refrigerant gas from the upstream side of the condenser to said valve, means feeding the refrigerant liquid from the valve to the evaporator, means feeding the hot refrigerant gas from the valve to the low pressure side of the system wherein hot refrigerant gas is not commingled with other fluids within said valve, and means in said valve governed by the position thereof for determining the relative proportions of refrigerant liquid and gas fed through the valve.

10. In a closed cycle refrigeration system having a condenser, an evaporator and a relatively continuously operating compressor and modulating to a predetermined temperature by the supply of refrigerant to the evaporator, a modulating valve, means responsive to said temperature and variations therefrom for controlling the position of said valve, means feeding refrigerant liquid to said valve, means within said valve for expanding said refrigerant liquid, means feeding hot compressed refrigerant gas from the upstream side of the condenser to the valve, means feeding said refrigerant liquid and gas from the valve to the evaporator whereby refrigerant liquid and gas are not commingled within said valve, and means in said valve governed by the position thereof for determining the relative proportions of refrigerant liquid and gas fed through the valve and modulating from a position where the liquid flow is at a maximum and the gas flow cut off to effect full cooling at the evaporator to a position in which the liquid flow is cut off and the gas flow at a maximum to provide a heating cycle in the evaporator.

11. In a closed cycle refrigeration system having a centrifugal compressor, a condenser and an evaporator, means for effecting relatively continuous operation of said compressor, and modulating means for said system comprising: a valve on the downstream side of the condenser for controlling flow of refrigerant liquid to the evaporator, temperature responsive means controlling the position of said valve, means feeding refrigerant gas from the high pressure side of the system to the low pressure side thereof, means governed by the position of said valve for controlling the amount of refrigerant gas so fed, and means in said valve providing for reverse drainage of liquid from the evaporator when the compressor is deenergized to terminate the operation of the system, the evaporator being located at a higher elevation than said valve so that liquid will drain from the evaporator under the influence of gravity.

12. In a closed cycle refrigeration system having a condenser, an evaporator and a relatively continuously operating compressor and modulating to a predetermined temperature by the supply of refrigerant to the evaporator, a modulating valve, means responsive to said temperature and variations therefrom for controlling the position of said valve, means feeding refrigerant liquid to said valve, means feeding refrigerant gas from the high pressure side of the system to said valve, means feeding said refrigerant liquid and gas from said valve to the evaporator, means in said valve governed by the position thereof for determining the relative proportions of refrigerant liquid and gas fed throuhg the valve, means biasing said valve to an extreme position when the compressor is deenergized to terminate system operation, and means in said valve operative in said extreme position for draining liquid from the evaporator, the evaporator being located at a higher elevation than said valve so that liquid will drain from the evaporator under the influence of gravity.

References Cited in the file of this patent

UNITED STATES PATENTS

| | | |
|---|---|---|
| 2,080,288 | McCormack | May 11, 1937 |
| 2,252,300 | McGrath | Aug. 12, 1941 |
| 2,614,394 | McGrath | Oct. 21, 1952 |
| 2,888,809 | Rachfal | June 2, 1959 |
| 2,921,445 | Ashley | Jan. 19, 1960 |
| 2,921,446 | Zulinke | Jan. 19, 1960 |
| 2,963,878 | Beggs | Dec. 13, 1960 |